June 7, 1960
E. L. CANFIELD
2,939,905
ELECTRICAL CONDUCTORS, CONNECTIONS AND METHODS OF CONNECTION
Filed March 5, 1954
11 Sheets-Sheet 1
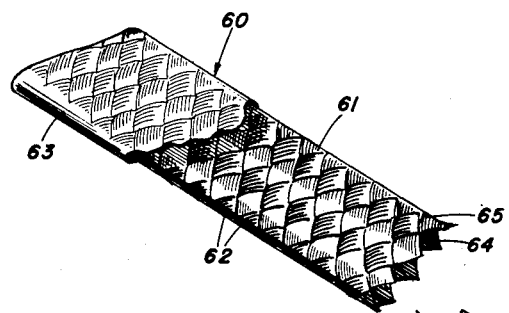
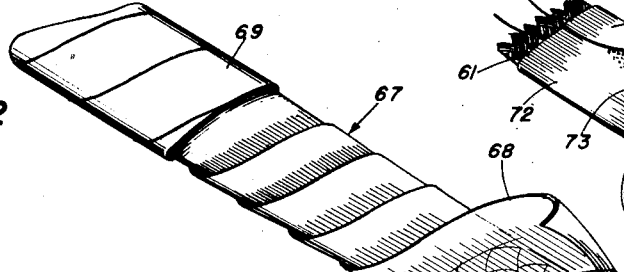
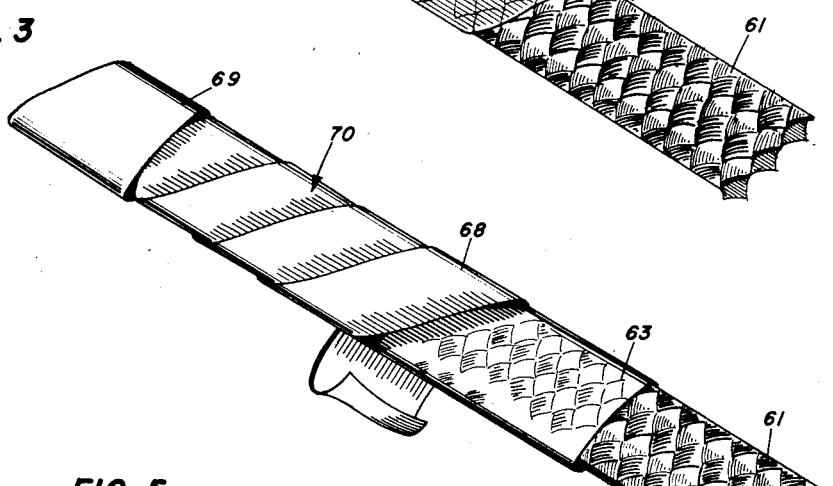
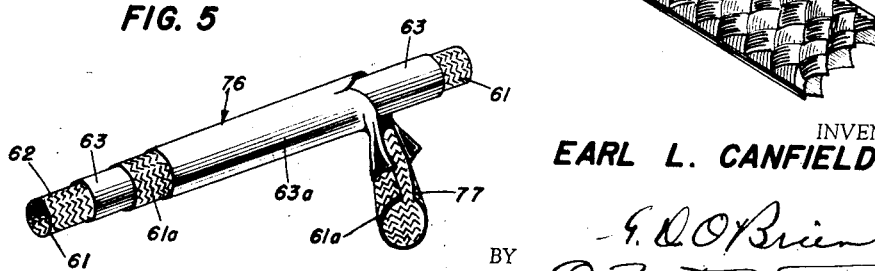
INVENTOR
EARL L. CANFIELD
BY
ATTORNEYS

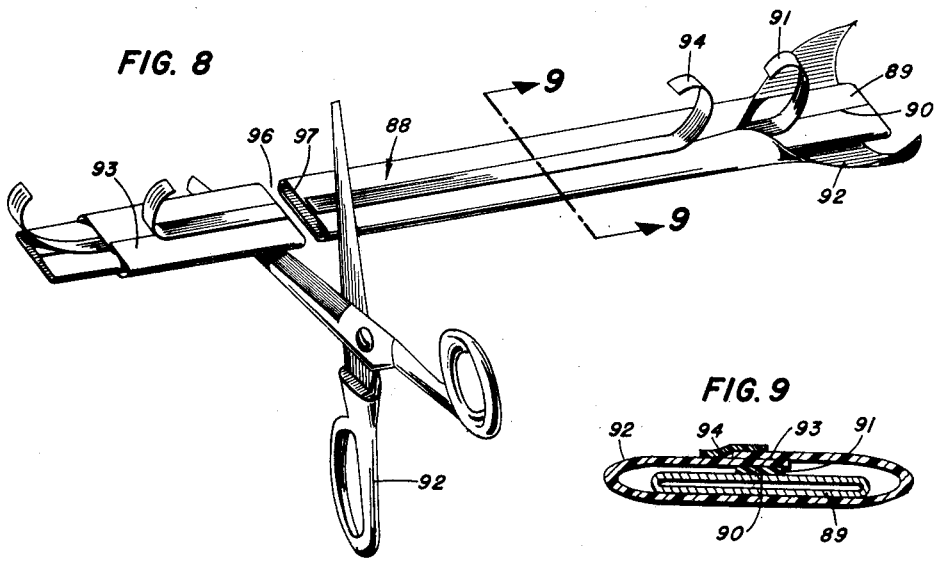
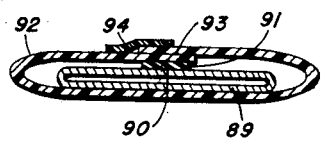
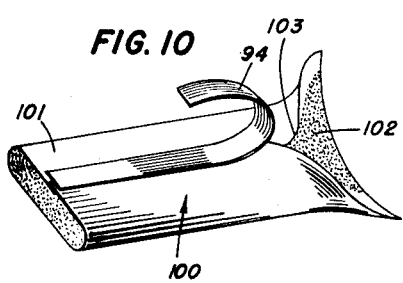
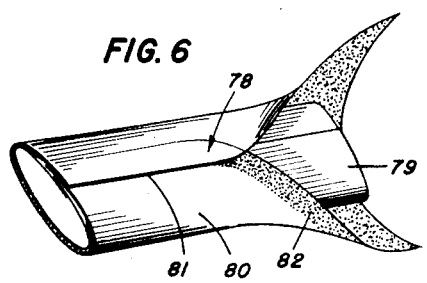
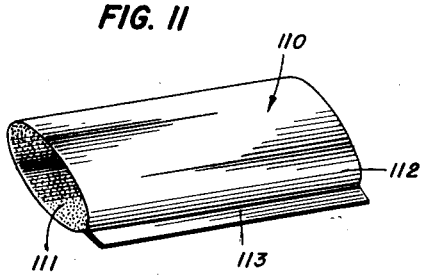
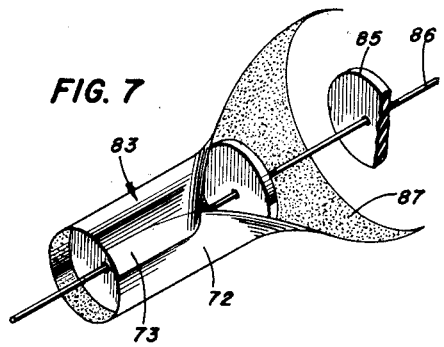
INVENTOR
EARL L. CANFIELD June 7, 1960
E. L. CANFIELD
2,939,905
ELECTRICAL CONDUCTORS, CONNECTIONS
AND METHODS OF CONNECTION
Filed March 5, 1954
11 Sheets-Sheet 3
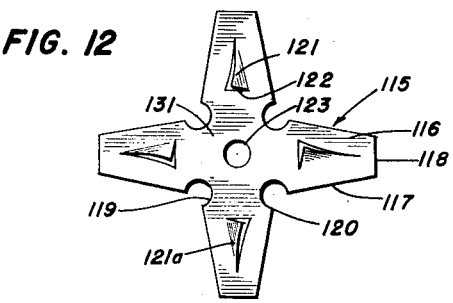
FIG. 12
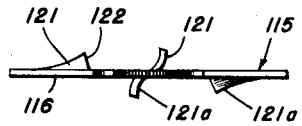
FIG. 13
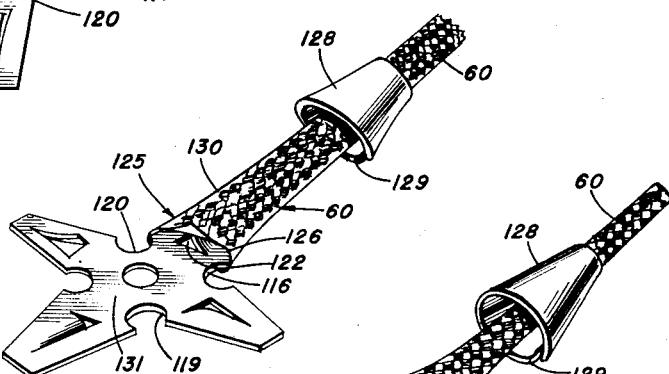
FIG. 14
FIG. 15
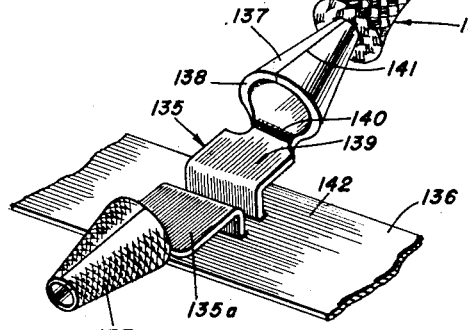
FIG. 16a
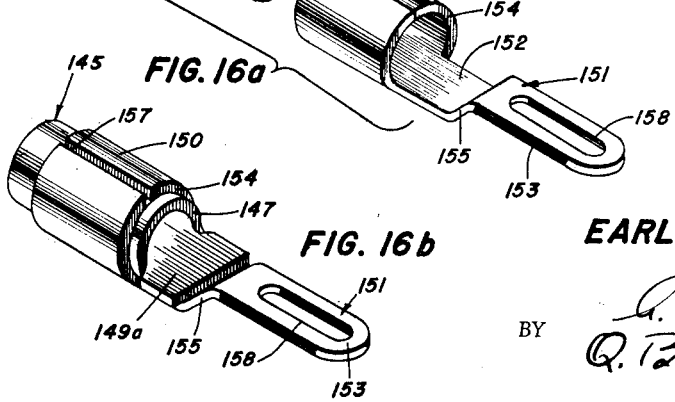
FIG. 16b
INVENTOR
EARL L. CANFIELD
BY
ATTORNEYS

INVENTOR
EARL L. CANFIELD

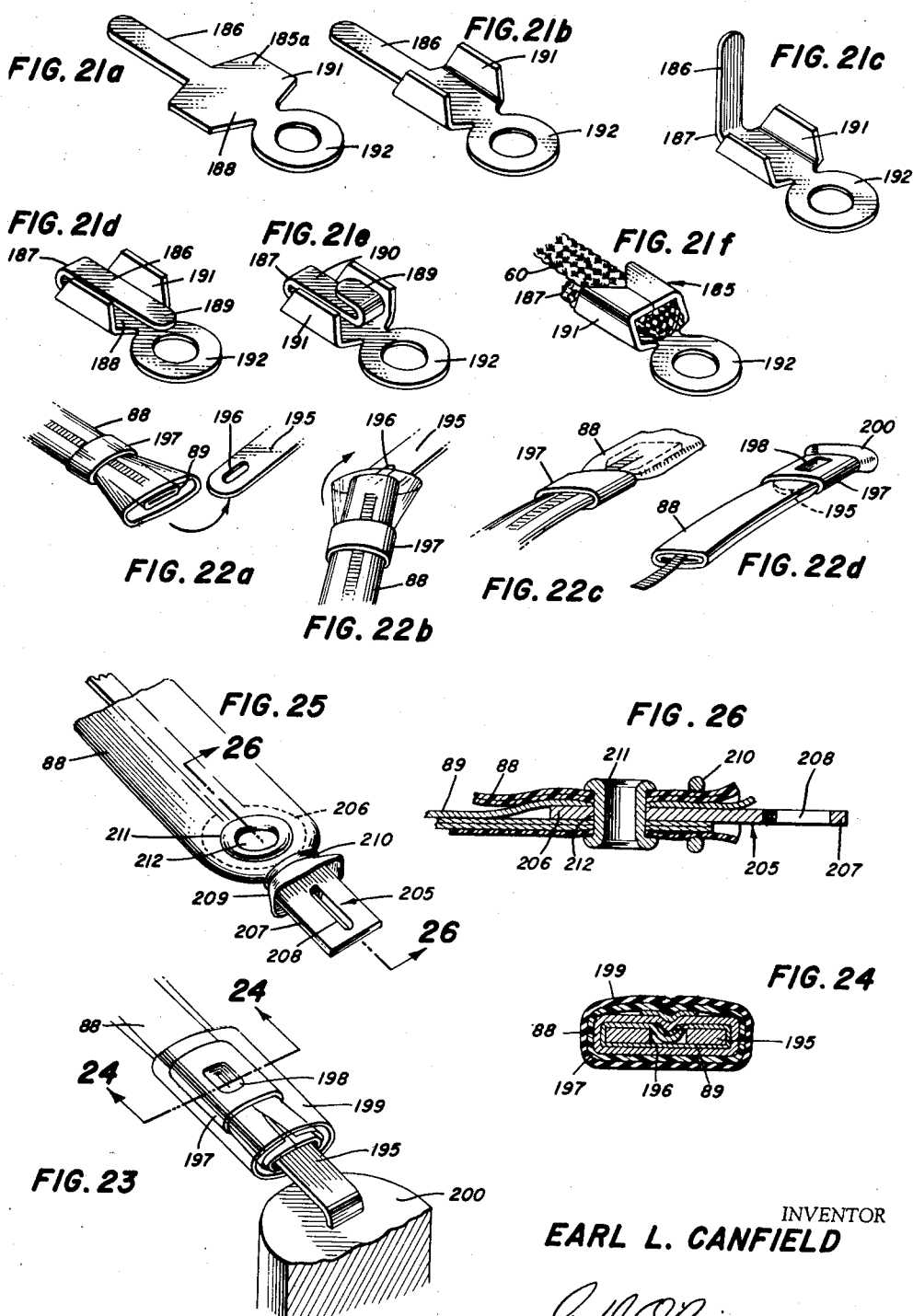

June 7, 1960
E. L. CANFIELD
2,939,905
ELECTRICAL CONDUCTORS, CONNECTIONS
AND METHODS OF CONNECTION
Filed March 5, 1954
11 Sheets-Sheet 6
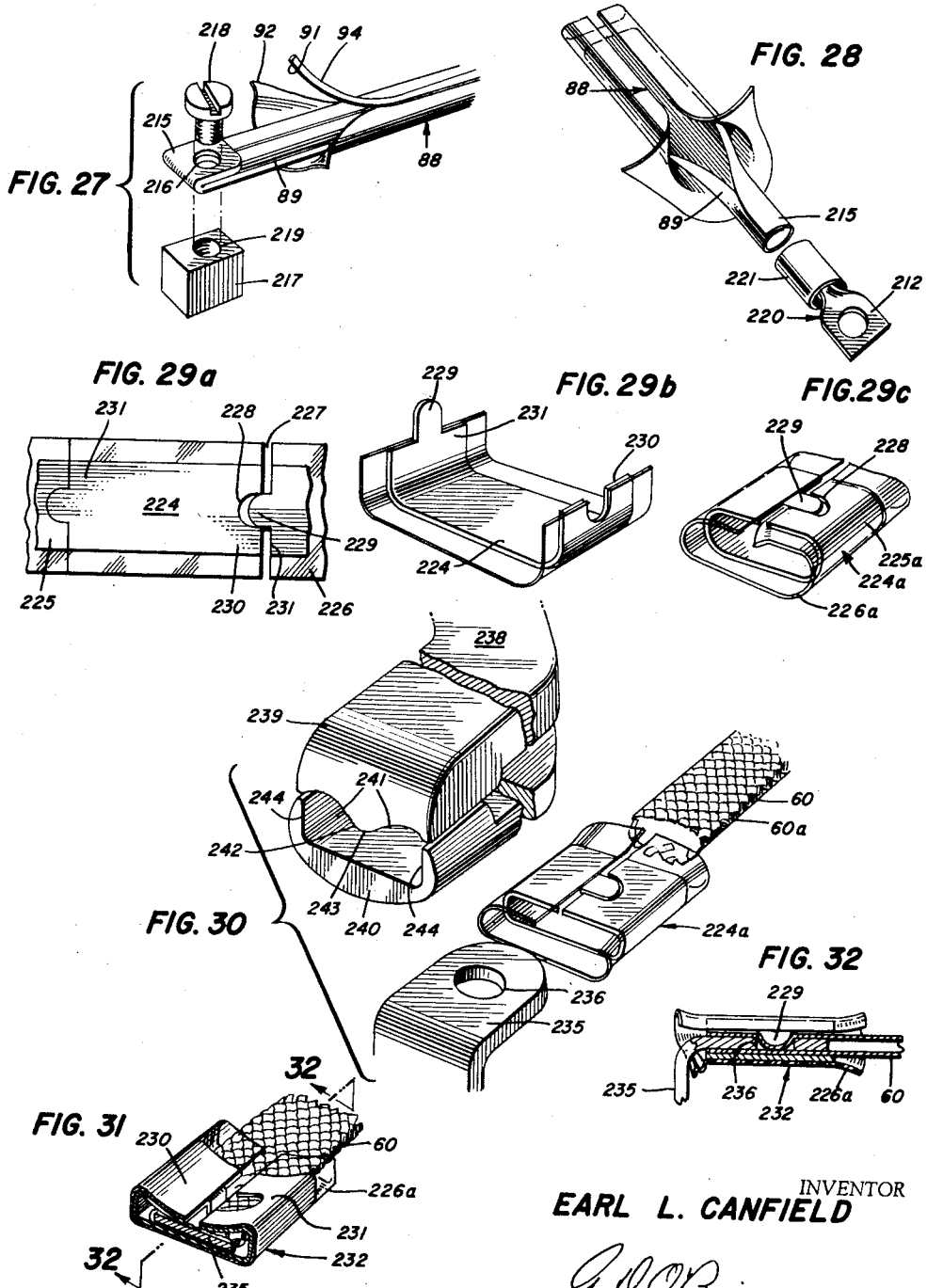
INVENTOR
EARL L. CANFIELD
BY
ATTORNEYS June 7, 1960

E. L. CANFIELD 2,939,905

ELECTRICAL CONDUCTORS, CONNECTIONS
AND METHODS OF CONNECTION

Filed March 5, 1954

INVENTOR
EARL L. CANFIELD

BY
ATTORNEYS

June 7, 1960
E. L. CANFIELD
2,939,905
ELECTRICAL CONDUCTORS, CONNECTIONS AND METHODS OF CONNECTION
Filed March 5, 1954
11 Sheets-Sheet 8
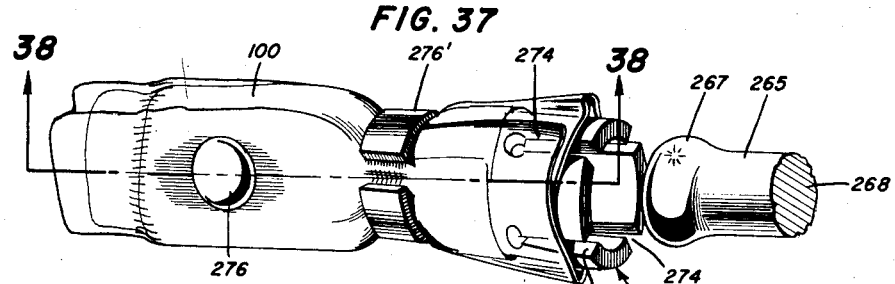
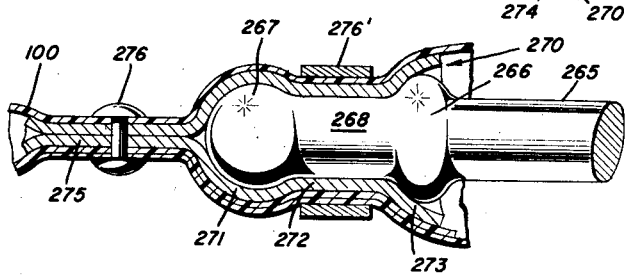
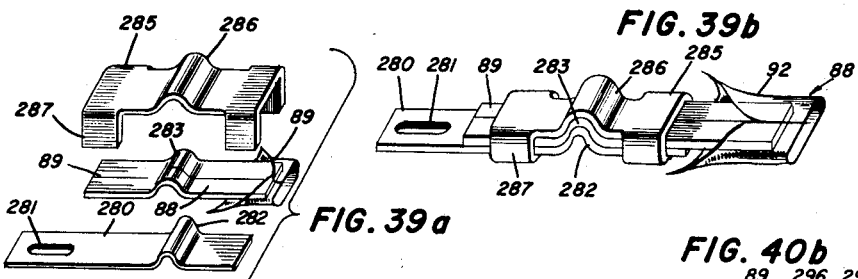
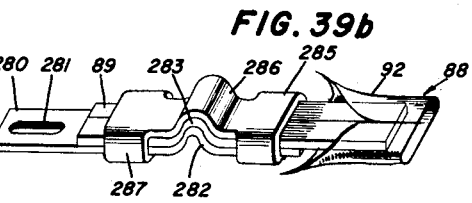
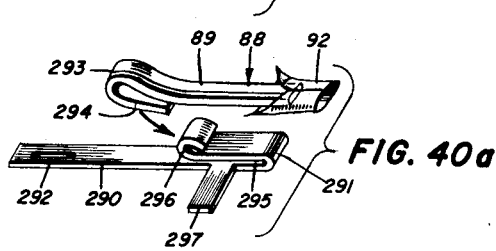
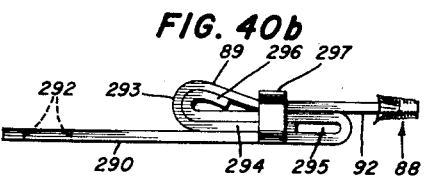
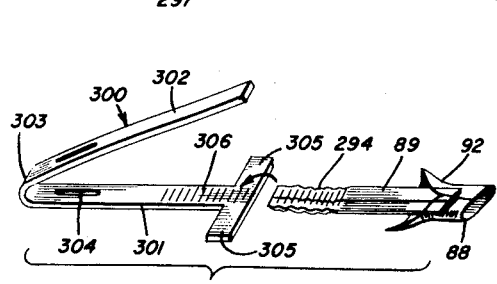
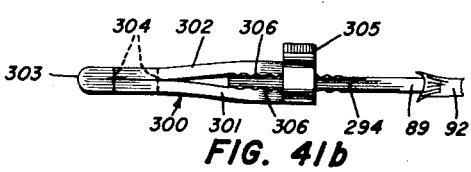
INVENTOR
EARL L. CANFIELD
BY
ATTORNEYS June 7, 1960
E. L. CANFIELD
2,939,905
ELECTRICAL CONDUCTORS, CONNECTIONS
AND METHODS OF CONNECTION
Filed March 5, 1954
11 Sheets-Sheet 9
FIG. 42
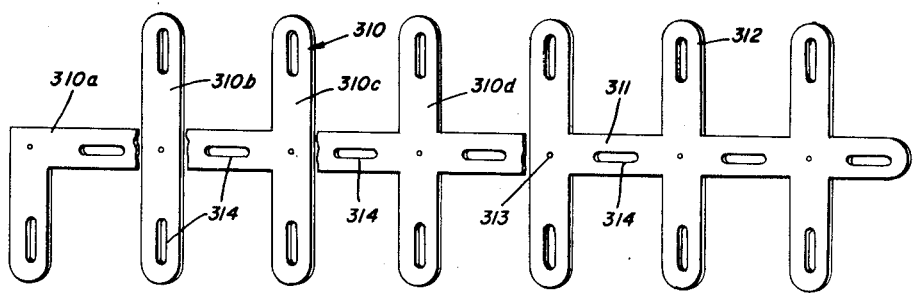
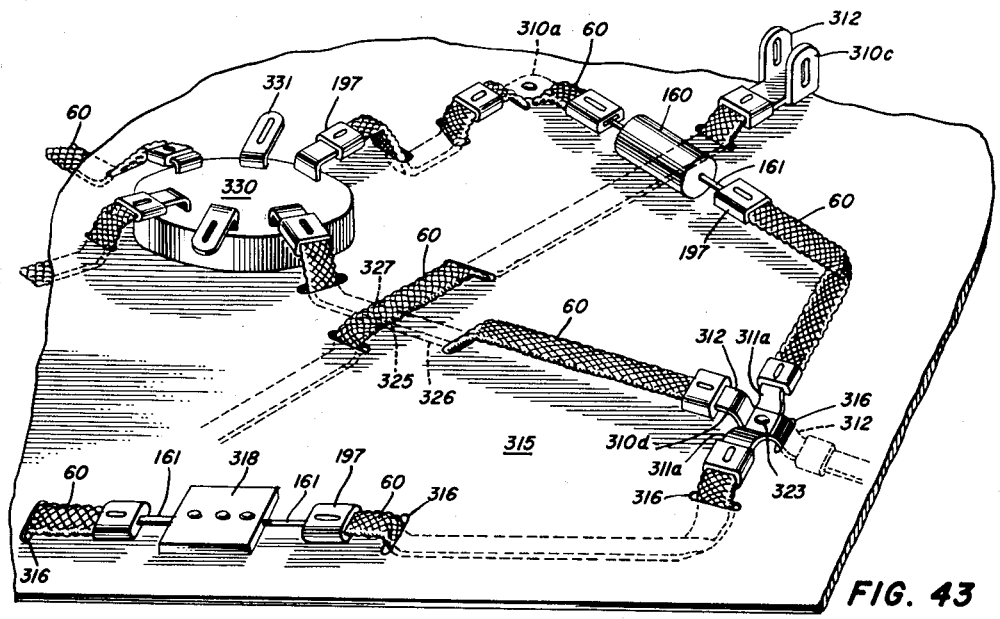
FIG. 43
FIG. 44
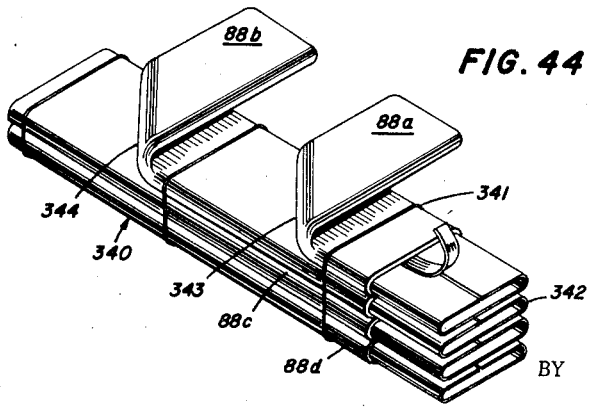
INVENTOR
EARL L. CANFIELD
BY
ATTORNEYS June 7, 1960
E. L. CANFIELD
2,939,905
ELECTRICAL CONDUCTORS, CONNECTIONS
AND METHODS OF CONNECTION
Filed March 5, 1954
11 Sheets-Sheet 10
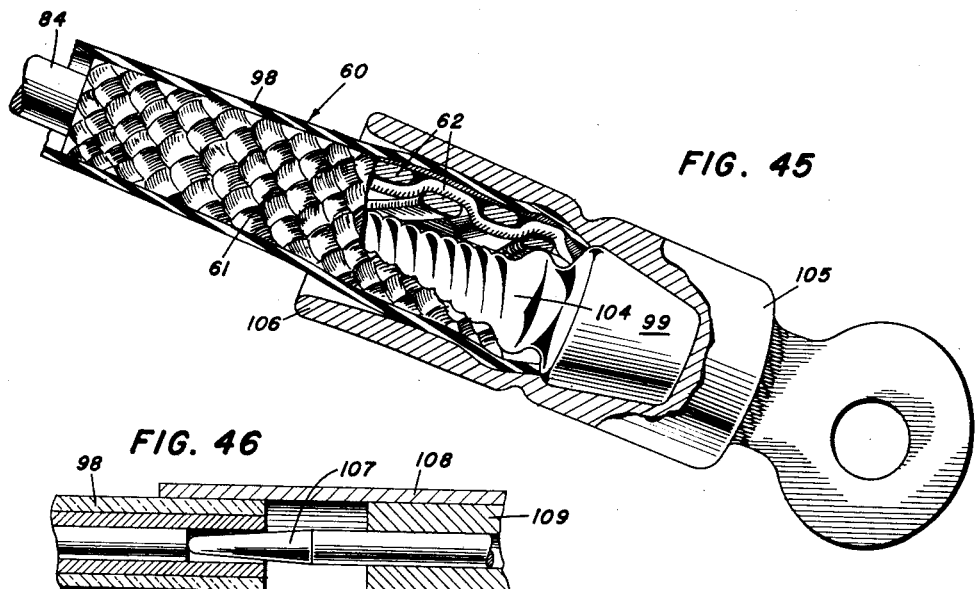
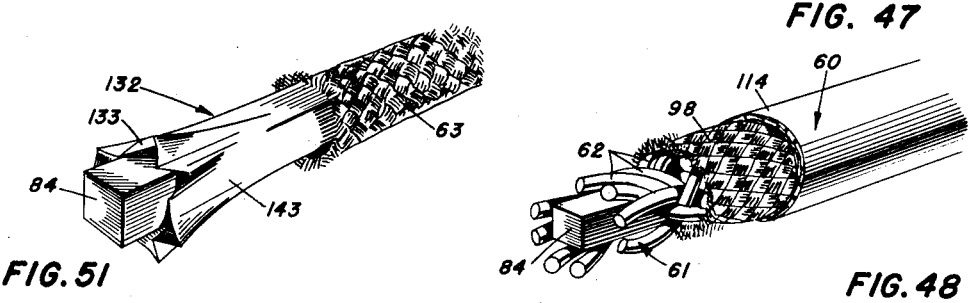
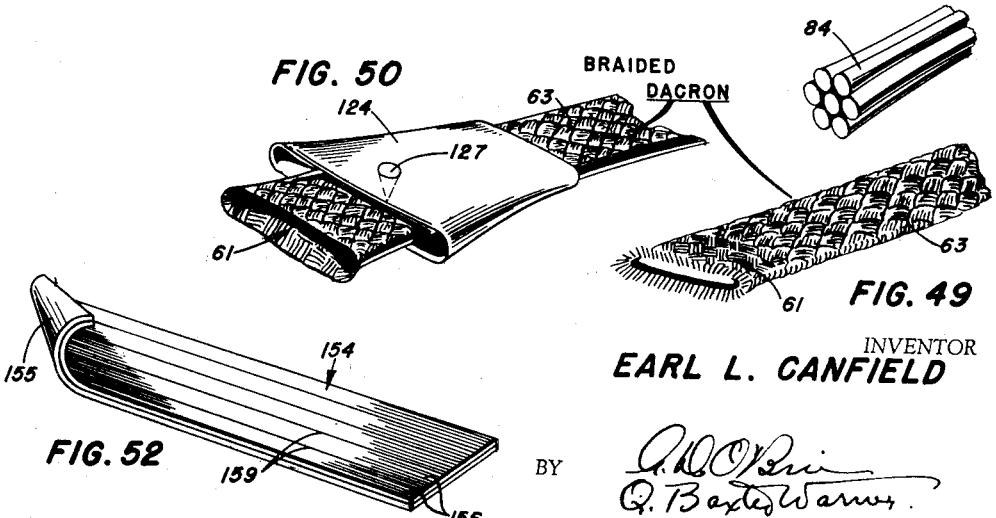
INVENTOR
EARL L. CANFIELD
BY
ATTORNEYS June 7, 1960
E. L. CANFIELD
2,939,905
ELECTRICAL CONDUCTORS, CONNECTIONS
AND METHODS OF CONNECTION
Filed March 5, 1954
11 Sheets-Sheet 11
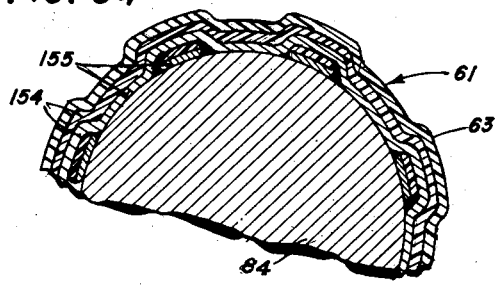
FIG. 54
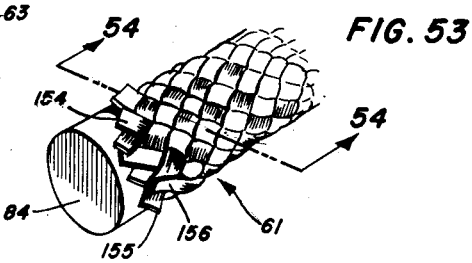
FIG. 53
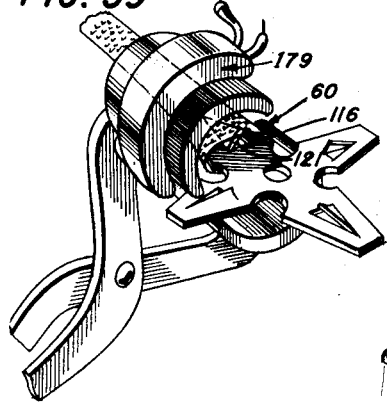
FIG. 59
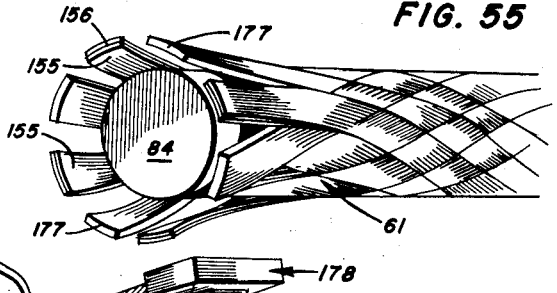
FIG. 55
FIG. 56
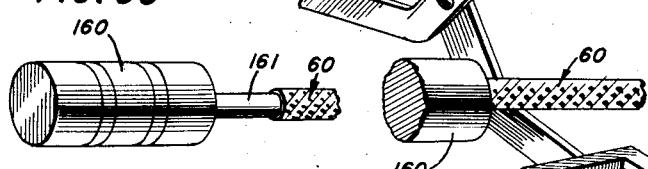
FIG. 58
FIG. 57
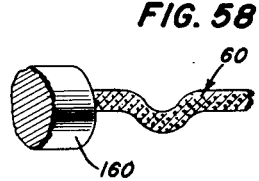
FIG. 60
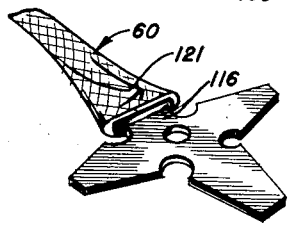
FIG. 61
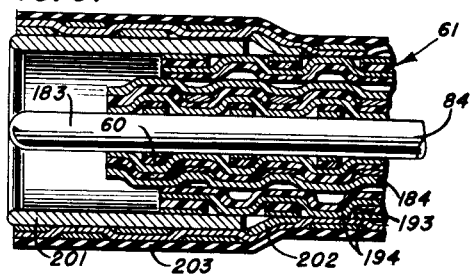
INVENTOR
EARL L. CANFIELD
BY
ATTORNEYS

United States Patent Office 2,939,905
Patented June 7, 1960

2,939,905

ELECTRICAL CONDUCTORS, CONNECTIONS AND METHODS OF CONNECTION

Earl L. Canfield, Book Hill Road, Essex, Conn.

Filed Mar. 5, 1954, Serial No. 414,294

9 Claims. (Cl. 174—71)

This application is a continuation-in-part of an application of Earl L. Canfield for patent on Electrical Conductors, Connections and Methods of Connection, Serial No. 380,957, filed September 18, 1953, now abandoned. The original application, so termed for convenience in identity, is predicated to a large extent on the braiding of strands of electrically conductive material in tubular form to produce a conductor which will have a high flex life.

In addition to offering a solution for improving the endurance of conductors, the original application devotes considerable attention to improving the connection of the foregoing conductor to a terminal. In that respect, the manufacture and maintenance of electronics equipment are typical of the problems that arise in the making of electrical connections, especially the soldered, solid-wire connections. The faults involved in connections of that sort are briefly listed as follows: damage to components and insulation due to overheating, embrittlement of copper wire, cold joints, trapped fluxes and oxides and errors of untrained operators.

Solderless connectors have come into use as an attempted remedy for those faults but a common source of failure with such connectors has been the difficulty of achieving a sturdy electrical contact between the solid wire and the terminal. In general, the mechanical connection could only be produced for a limited external contact between the solid wire and the terminal, the "spring-back" resiliency either of the wire or the connecting clip and the consequent relaxation of pressure being responsible for the foregoing limitation and resulting imperfect contact.

In making electrical connections, whether solderless or not, insulation has to be stripped off of the ends to carry out either purpose, and in the case of multiple-stranded wire it is rather usual that numbers of the strands will be broken and drop off with an obvious reduction in the current carrying capacity of the wire. Thus, being confronted with the certain breakage of solid wires after relatively few flexures, the breaking out of strands of multiple-strand wires when stripping insulation and the stated imperfections of known solder and solderless joints the aim herein is to arrive at a conductor and its mode of connection with a terminal that will avoid all of said faults.

The braided conductor mentioned at the beginning becomes the remedy. This conductor is flattened in most cases and in others is left cross-sectionally cylindrical, but in all cases is supplemented with an insulating sheath which extends to the end of the wire or over the attached terminal to provide the necessary guard against current leakage, the infiltration of moisture and dirt and against any common equivalent hazard.

As brought out in the original application, multiple-stranded wire has a number of specialized uses, particularly when composed of thin and narrow ribbons of electrically conductive metal, in other words strips of foil or tinsel, but these have a frailty which can endure only limited pulling and flexing before the danger of breaking enters. To offset that danger and, in fact, prevent it in all normal uses, the braiding is resorted to, and when the braiding is fortified either by a resilient sheath on the outside, a resilient core on the inside or resilient sheathing and coring both outside and inside the conductor is raised to a high standard of durability even though the metallic conducting part is inherently weak.

With the foregoing considerations as a background, an object of the invention is to provide a tubular conductor of braided, electrically conductive strands, which enables making electrical connections with terminals without the use of solder in a manner more perfect than currently possible with known equipment.

It is a further object of this invention to provide a tubular electrical conductor of a pliant construction which will have a high resistance to breaking by flexure, that is, a high flex life.

It is a further object to provide a tubular electrical conductor for making low resistance, internal connection with a terminal lug received therein.

It is yet a further object of this invention to provide a tubular conductor in which the exterior insulating wall will be sealed co-extensively upon an interior conductive wall when connection has been made, thus to eliminate a need of stripping insulation and of using short, generally ill-fitting sleeves of insulation to protect connections.

Another object of this invention is to provide a tubular electrical conductor arranged to receive internally a terminal lug in so ready a manner that automatic assembly is feasible.

Another object of the invention is to provide a resilient core, usually but not necessarily always of solid insulating material, the particular function of which is to fortify the inherently frail electrical conductor braided on or otherwise applied to it, so that the conductor will be saved from breaking because of the tensile strains being taken by the core.

Yet another object of this invention is to provide terminal lugs and clips for making connection with tubular conductors of such design that good connections may be expected from relatively unskilled laborers, without need of training in the use of solder.

Still another object of this invention is to provide an assemblage of tubular conductors, terminal lugs and clips wherein tensile strains imposed upon the assembly will be borne largely by the insulating wall of the conductor, whereby low-strength conductive materials such as aluminum may be employed in the conductor and consequently throughout the system.

A further object of the invention is to use a bifacial wrap-element for the conductor, that is to say, an element with a conductive stratum on one side and an insulating stratum on the other side, said element being either wide enough to form an entire enclosure or narrow enough (ribbon-like) to form the strand of a braiding.

A further object of the invention is to use the principle of shrinking by the application of heat to perfect a terminal connection, the wrapper-substance chosen for this purpose responding with a shrinking when subjected to heat.

Other objects and advantages of this invention will be apparent to those skilled in the art upon a consideration of the description here following and the drawings in which:

Figure 1 is a perspective view of a braided tubular conductor with the insulating coating cut-away for illustrative purposes.

Figure 2 is a perspective view of a braided tubular conductor with the inner layer of insulation partly unwrapped and the outer layer of insulation cut away for illustrative purposes.

Figure 3 is a braided tubular conductor with the inner and outer layers of insulation cut away and the intermediate layer unwrapped partially for illustrative purposes.

Figure 4 is a perspective view of a braided conductor with a folded layer of insulation unfolded at one end for illustrative purposes.

Figure 5 is a perspective view of a coaxial tubular conductor with the outer conductor disposed at one end for internal connection.

Figure 6 is a folded tubular conductor with an end thereof unfolded to illustrate its construction.

Figure 7 is a coaxial conductor with an end thereof unfolded and an insulating disc cut away for purposes of illustration.

Figure 8 is a perspective view of another embodiment of folded conductor with the ends thereof opened for illustrative purposes and a transverse cut taken at an intermediate point.

Figure 9 is a sectional view taken along the line 9—9 in Figure 8.

Figure 10 is a perspective view of a folded tubular conductor of another form.

Figure 11 is a perspective view of a tubular conductor of yet another form.

Figure 12 is a plan view of a multi-terminal connector element.

Figure 13 is a side elevational view of this connector element.

Figure 14 is a perspective view of this connector element being assembled in connection with a braided tubular conductor.

Figure 15 is a perspective view of a hollow, conical terminal lug being assembled with a braided tubular conductor.

Figure 16a is an exploded perspective view illustrating an adapter positioned to receive a standard terminal lug.

Figure 16b is a perspective view of the parts in Figure 16a assembled.

Figure 17b is a perspective assembly view of the parts illustrated in Figure 17a.

Figure 18b is a perspective assembly view of the parts illustrated in Figure 18a.

Figures 21a, 21b, 21c, 21d, 21e and 21f illustrate steps in the assembly of another type of terminal connector with a braided tubular conductor.

Figures 22a, 22b, 22c and 22d illustrate steps in the assembly of a tubular conductor with a slotted terminal lug.

Figure 23 is a perspective view of the connection illustrated in Figure 22d modified by the addition of an insulating sleeve embracing the connection.

Figure 24 is a sectional view taken along the line 24—24 in Figure 23.

Figure 25 is a perspective view of a tubular conductor assembled with another type of terminal connector.

Figure 26 is a sectional view taken along the line 26—26 in Figure 25.

Figure 27 is an exploded perspective view of another type of terminal connection for a folded tubular conductor.

Figure 28 is an exploded perspective view of a modified form of terminal connection for a folded tubular conductor.

Figure 29a is a plan view illustrating the part and first step in the making of a ferrule.

Figure 29b is a perspective view of a partially formed ferrule.

Figure 29c is a perspective view of a formed ferrule ready for assembly.

Figure 30 is a composite perspective view of the ferrule in Figure 29c positioned for connection with a braided tubular conductor to a terminal by operation of the shown clinching tool.

Figure 31 is a fragmentary perspective view of the connection formed by the ferrule in final clinched position.

Figure 32 is a sectional view taken along the line 32—32 in Figure 31.

Figure 37 is an exploded perspective view of a tubular conductor fitted with a connector arranged to receive a terminal lug.

Figure 38 is a sectional view of the connection formed thereby taking along the line 38—38 in Figure 37, most of the terminal lug being in elevation.

Figure 39a is an exploded perspective view of another type of terminal connection arranged for assembly.

Figure 39b is a perspective assembly view of this terminal connection.

Figure 40a is an exploded perspective view of a modified terminal connection arranged for assembly.

Figure 40b is a side elevational assembly view of this modified terminal connection.

Figure 41a is an exploded perspective view of a further modified terminal connection arranged for connection.

Figure 41b is a side elevational assembly of this further modified terminal connection.

Figure 42 is a plan view of a terminal connector strip with portions thereof severed to illustrate various terminal connector forms.

Figure 43 is a perspective view of a circuit layout utilizing braided tubular conductors.

Figure 44 is a perspective view of a harness made from a multiplicity of folded tubular conductors.

Figure 45 is an enlarged sectional view, partly in elevation, illustrating the embodiment of a resilient conductor core.

Figure 46 is a sectional view, partly in elevation, illustrating an opening tool adapted for use with a filament-type of tubular conductor.

Figure 47 is a perspective view of the type of conductor in Figure 45, showing the use of round wires instead of flat strips in the braiding.

Figure 48 is a detail perspective view showing how the central core can be modified by stranding.

Figure 49 is a perspective view of a tubular conductor having a braided Dacron cover.

Figure 50 is a perspective view of the conductor in

Figure 17A:
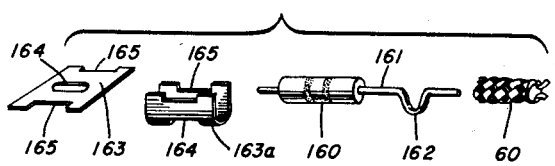
Figure 17a is an exploded perspective view of the parts used in connecting a resistor with a braided tubular conductor.

Figure 49, illustrating a metal ferrule with an impaling pin.

Figure 51 is a perspective view illustrating the use of bimetallic foil.

Figure 52 is a perspective view illustrating a type of bifacial sheeting.

Figure 53 is a perspective view illustrating how the bifacial strands are braided after splitting the sheeting in Figure 52.

Figure 54 is a cross-section taken substantially on the line 54—54 of Figure 53.

Figure 55 is a perspective view illustrating how insulating strands can be interposed in the bifacial conductor braiding.

Figures 56, 57 and 58 illustrate a type of connection wherein a combined crimping and shrinking are employed to secure the covering.

Figure 59 is a perspective view illustrating how shrinking by heat can be accomplished on a terminal of the type in Figure 12.

Figure 60 is a perspective view showing the completed terminal connection.

Figure 61 is a sectional view, partly in elevation, of a concentric arrangement of conductors and terminals.

Similar characters of reference are used in all of the above figures to indicate corresponding parts. The term "terminal lug" is used generically to denote any element to which the end of a conductor is electrically connected.

In Figure 1 is illustrated a tubular electrical conductor 60 having an interior wall 61 formed of flat, flexible, closely woven strands 62 of conductive material preferably braided over and under in oppositely running helices. The flat strands 62 may suitably be composed of metallic tinsel or foil strips of the kind familiarly employed in fabric ornamentation. As a consequence, the conductor 62 is very pliant and may be collapsed by flattening. In bending the conductor, the strands 62 will twist, if necessary, so as to run flat around the bend. Because the flat strands have a high flex life, the conductor, too, will have a high flex life.

The closely woven tubular conductor thus will be pliant, collapsible, and highly resistant to breakage by flexure. Moreover, it will enlarge and contract somewhat as the braid is loosened or tightened. As few as four strands may be used and a braided conductor may be provided which is equivalent in ohmic resistance to number 30 solid wire. Whereas such a small gage of solid wire is embrittled by soldering, it ohmic equivalent in the braided tubular conductor has been found well-suited to the making of fast mechanical connections with good electrical contact.

To resist abrasion and fraying and to insulate the interior wall 61, there is provided an outer wall 63 of insulating material. This material may be applied as a coating by any effective process such as hot dipping by which the coating may be made to adhere closely to the inner conductive wall. An exemplary material which this insulating wall 63 may be composed of is "nylon," a thermosetting synthetic plastic described in Patent No. 2,130,948, issued September 20, 1938, and referred to therein as a polyamide obtained by condensation polymerization from diamine and dibasic carboxylic acid. Other well-known insulating plastics and varnishes may also be suitable for such use. With such a coating, the tubular conductor 60 remains pliable so as to conform with any desired wiring layout and collapsible so as to be susceptible to compression upon terminal lugs by mechanical clinching pressures and to flattening for use in flat circuitry.

To provide a relatively continuous interior conductive surface and to prevent intrusion of the insulating coating into the interior of the tubular conductor at the time of its application, longitudinal edges of adjacent running strands 62, such as edges 64 and 65, extend spirally in substantially abutting relationship. For this reason, the braided tube 61 is substantially imperforate.

Inasmuch as a variety of insulating covers may be provided for the braided tube 61, there is illustrated in Figure 2 a conductor 67 having a braided conductive tube 61 wrapped with a ribbon 68 of an abrasion resistant, insulating material, such as "Mylar." "Mylar" is a proprietary product of E. I. du Pont de Nemours and Company and is a polyester film made from polyethylene terephthalate, the polymer formed by the condensation reaction between ethylene glycol and terephthalic acid. This highly dielectric film is tough, durable and flexible over a range of temperatures from —60° C. to 150° C. Over the spirally wrapped ribbon 68 may be applied a coating 69 of any suitable composition, such as that composition suggested for the coating 63, whereby the ribbon will be held in place. Since the ribbon 68 is not bonded to the braided tubular conductor 61, relative slippage may take place there between to enhance the flexibility of the insulated conductor 67.

As a modification of the braided tubular conductor 60 and 67, there is shown in Figure 3 a conductor 70 having the coating 63 applied upon the interior conductive wall 61. Over this coating is applied the spirally wrapped ribbon 68 which, in turn, is bonded in place by the coating 69.

A shielded conductor 71 is illustrated in Figure 4 wherein the braided conductor 60 is provided with a sheath 72 of insulating material in tubular form and adhesived lap seam 73 extending longitudinally of the conductor 60. The seam 73 may be secured by any adhesive, but preferably a pressure sensitive adhesive which will permit rapid, automatic application of the insulating sheath 72 to the braided conductor 60. Again, the insulating material "Mylar" may be employed for the sheath 72 and, being less yieldable than the conductor 60, will carry most of any tensile stress imposed. Since no method is now known for extruding or dip coating with "Mylar," the construction of the sheath 72 is of a form advantageous to its use. The interior surface of the sheath 72 may have a conductive coating 74 bonded thereto which will serve as an electrical shield. Moreover, colored strands 75 braided in with the conductive strands 62, or in lieu of one or more conductive strands, may be seen to afford a positive identification of the shielded conductor 71.

In Figure 5, there is illustrated a coaxial-type conductor 76 wherein the interior braided conductive tube 61 is formed of woven flat strands 62 and has the insulating tube 63 bonded to its outer surface. In firm contact with the outer surface of the insulating tube 63, but not bonded thereto is a second conductive tube 61a constructed like the tube 61, but of larger diameter. An exterior tube 63a of insulating material is bonded to the outer surface of the conductive tube 61a, preferably in the same fashion that the insulating tube 63 is bonded to the interior tube 61. Accordingly, the dielectric region afforded by the insulating tube 63 spaces the conductive tubes 61 and 61a in coaxial relationship. Yet, further, a breaking away of the outer tubes 61a and 63a from the inner tubes 61 and 63 by cutting, for example, will readily form a sleeve 77 for internal connection with any suitable terminal lug (not shown).

In addition to the braided type of tubular conductor, there is envisioned a folded type of tubular conductor. Thus, a conductor 78 is illustrated in Figure 6 having a conductive interior wall 79 composed of a unitary film-like strip which is folded transversely of itself to assume a tubular configuration. This interior wall 79 may be composed of copper or aluminum foil, for example, or other conductive metal foils. The insulating cover 80 is provided as an exterior wall of tubular configuration which, like the covering 72, has a sealed longitudinal seam 81. Appropriately, the covering 80 may be secured by an adhesive 82 to the interior wall 79. By reason of the great flexural stamina of metallic foil, a high flex life is imparted to the pliant tubular conductor 78.

While the effective cross-sectional area of the interior wall 79 may be so slight as to render this interior wall incapable of sustaining the tensile stresses encountered in the hook-up and use of conductors, the covering 80 of "Mylar" polyester film, having a tensile strength exceeding that of hard aluminum, will sustain the bulk of the tensile stresses.

This ability of the insulating cover, when composed of "Mylar" or like material, to sustain the principal portion of tensile loads imposed on the tubular conductor is an important feature of this invention. The consequence of this high load carrying capacity in the insulation is a previously unrealized freedom to employ relatively low strength, low resistance materials for the conductive portion of the conductor.

In further exemplification of this principle wherein the insulating cover is to bear the primary tensile load, there is illustrated in Figure 7 a coaxial conductor 83 having an exterior insulating wall 72 formed by transversely folding a strip of insulating material, such as "Mylar." This exterior wall 72 is pliant and collapsible in nature, although it is maintained in a relatively stable, cylindrical form by means of circular insulating discs 85 threaded like beads upon a solid conductor wire 86. By these discs 85 the wire 86 is supported centrally in relation to an interior conductive wall 87 which may comprise a metallized deposit upon the interior of wall 72. If desired, longitudinal seam 73 in the outer wall 72 may be sealed in a manner which will permit opening an end of the wall to expose the central wire 86 for connection to a terminal lug (not shown).

In Figure 8, a tubular conductor 88 is provided with an interior conductive wall 89 having a longitudinal butt-type seam 90 firmly held by means of an overlying seal strip 91. An exterior wall 92 of insulating material in tubular form is illustrated most clearly in Figure 9 as including a lapped longitudinal seam 93 secured by seal strip 94, which is well suited for use when the exterior wall 92 is composed of "Mylar." Either or both of the seal strips 91 and 94 may be colored in accordance with a code for identification of the conductor 88. It is important to note that the construction of the conductor 88 adapts it readily to assumption of a flattened cross-section, whereas the braided tubular conductors illustrated in Figures 1 through 5 will generally tend to have a circular cross-section. For clarity of illustration, the void space between the interior wall 89 and the exterior wall 92 has been exaggerated in Figure 9.

To exemplify the ease with which the conductor 88 may be sized to any suitable length, a pair of common scissors 95 are positioned adjacent a transverse cut 96 which the scissors may make. It will be appreciated that this ease of sizing to length is an attribute to each of the embodiments of conductors herein described by virtue of employment of film-like or ribbon-like constructional components. As will subsequently be made apparent, the termination at 97 for the conductor 88 which a transverse cut provides is well suited for connection to terminal lugs without stripping the insulation or other such modification. In other words, the conductor when provided with the termination 97 wherein the conductive interior wall 89 is coextensive or flush with the insulating exterior wall 92 is immediately ready for making electrical hook-ups.

The conductor 100 in Figure 10 has a pliant, collapsible form by reason of its construction from a tube 101 of insulating material such as "Mylar" with a metallized interior wall 102. The seal strip 94 may here be used to secure the longitudinal seam 103.

In Figure 11, there is illustrated a tubular conductor 110 of pliant, collapsible form having a conductive interior wall 111 formed by metallization of the interior surface of an insulating tube 112. While the polyester film "Mylar" is a particularly suitable material for the tube 112, other sheet-like insulating materials may be employed. In any event, it is contemplated that the tube 112 should be formed with a longitudinal butt-type seam 113 suitably sealed in an outwardly flaring position.

Turning now to the consideration of means and methods for connecting the above-described pliant tubular conductors to terminal lugs and the like, attention is first directed to cross connector 115 in Figure 12 which provides a four-way junction. This connector may be formed from a conductive sheet material such as copper or aluminum by stamping or otherwise. In configuration, the strip has four arms 116 arranged in a cross with side edges 117 tapering toward their junction with squared-off terminal edges 118. Reentrant circular fillets 119 are arranged at the roots of the arms 116 to define shoulders 120 confronting the inward points of juncture for the side edges 117. The arms 116 are further provided with curled, triangular barbs 121, which have a taper generally similar to the taper of the edges 117, and which provide shoulders 122 generally in line with the shoulders 120 for each arm 116. These barbs may be struck out oppositely in the arms which are diametrically opposed, as exemplified by the barbs 121 and 121a. A centrally disposed aperture 123 facilitates securement of this cross connector 115 in various suitable ways.

In making a connection 125 with this cross connector 115 no tools need be used. Instead, a pliant, tubular conductor, such as the braided conductor 60 is forced endwise over an arm 116 until the shoulders 120 and 122 are contained within the terminal edge 126 of the conductor. Thereupon a ferrule 128 tapered complementary to the arm 116 is pushed along in sliding relation to the conductor 60 until lip 129 inturned from the ferrule edge of larger diameter locks over the shoulders 120 and 122. The terminal edge portion 126 of the conductor 60 will then be secured between the lip 129 of the ferrule and the shoulders 120 and 122 to hold the conductor 60 firmly against pulloff. For a very firm locking action, the ferrule 128 is preferably composed of an elastic, rubber-like material, such as molded "nylon" or polyethylene. It will be apparent that the ferrule 128 may be distorted from true circular shape when in locking position on the arm 116 and that forces tending to restore it to circular shape will bind the ferrule upon the conductor 60 forcing the interior wall of the conductor into intimate electrical contact with the edges 117 of the arm 116. Moreover, the transparent coating 130 which provides an exterior insulating wall for conductor 60 will extend to the terminal edge 126 of the conductor for complete insulation thereof. Further use of an insulating material for the composition of the ferrule 128 will avoid any electrical hazards which might arise if the shoulders 120 or 122 puncture the insulating wall 130. It will be appreciated, of course, that one or more of the arms 116 may be bent away or cut off at their weakened roots 131 lying between the fillets 119. On the other hand, the arms 116 may be associated with other connector configurations of any usable type.

In Figure 15 a connector set 134 is illustrated of a form similar to the connection 125 in Figures 12, 13 and 14. Instead of the flat connector 115, there is provided a terminal arm 135 suitable for mounting on a panel 136. This arm 135 has an outwardly converging, tapered, conical portion 137 to receive the conductor 60. At the inward major circumference of the portion 137 there is provided a shoulder 138, which provides effective locking action with the inturned lip 129 of the ferrule 128. For rapid, inexpensive manufacture, the terminal arm 135 may be constructed from sheet metal having a strip-like shank portion 139 and the conical end portion 137 joined therewith at an inwardly cut neck 140. In a suitable rolling operation, the opposite edges 141 of the portion 137 (original in the form of a trapezium) may be rolled into abutting relationship to form a cone, while the shank portion 139 may be provided with a bend 142 as may be desired.

When the terminal arm and the conductor are composed of aluminum, it may be desirable to provide a roughened contact arm to pierce the insulating oxides, such as is provided by the contact arm 135a having a knurled contact portion 173a.

Both the connector sets 125 and 134 illustrated in Figures 14 and 15 have the advantage of facilitating low resistance, strain-resistant connections without the use of tools or solder. The locking action here exemplified is particularly suited to use in confined spaces, such as are found in multiconnector sockets, where the terminal lugs may be relatively inaccesible to tools.

In further regard to multiconnector sockets, Figures 16a and 16b illustrate a manner of adapting the so-called AN connector now in standardized use by the U.S. Army and Navy to connections with a plurality of pliant, tubular conductors. Thus, the terminal pin 145 is of the now-standardized AN form comprising a cylindrical machine shank 146 cut away at one end on a diametral line to form a notch 147 exposing a solder well 148 of limited depth. The remaining end portion 149 is of thin semi-cylindrical configuration. This end portion 149 is inserted in a band portion 150 of an adapter 151. The adapter 151 is further provided with a flat portion 152 joining the band portion 150 and a slotted connector portion 153 offset inwardly from said flat portion. When the terminal pin 145 is in assembled relation with the adapter 151, as seen in Figure 16b, the end portion 149 will be athwart the flat portion 152. By a suitable tool, the adapter and the terminal lug may be clinched in locked position by flattening the end portion 149 so that it appears as at 149a, against the shank portion 152, thus wedging its new rectangular form between shoulder 154 of the band portion 150 and a sloped shoulder 155 joining the flat portion 152 and the offset connector portion 153.

When the adapter 151 is formed from a resilient, electrically conductive sheet material with the band portion 150 formed by rolling so as to have a longitudinal seam 157, that seam may be resiliently opened when the shank 146 of the AN terminal 145 is received in a forced, snug fit. This snug fit between these cylindrical portions 146 and 150, together with the locking action of the flattened end portion 149a, results in an extremely effective electrical and mechanical coupling between the AN terminal and the adapter. Connection may then be made to the connector portion 153 of the adapter 151 by any means, such as are herein described. Thus, although the connector portion 153 is shown provided with a slot 158 it might equally well be formed in the manner of the terminal arm 116 in Figure 12 or the arm 135 in Figure 15. The combination of the adapter with the AN terminal pin thus provides an effective and economical solution to the difficulties heretofore encountered in the use of soldered connections with AN connectors.

Figure 17B:
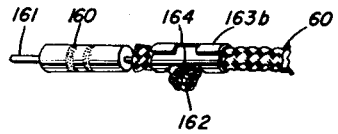

Further provided within the purview of this invention are a series of simple and effective connections to be made between terminal lugs and the tubular, pliant conductors, such as the braided conductor 60 of Figure 1. These connections generally are typified by a bight in the portion of the terminal lug over which the tubular conductor is received, together with a ferrule for locking the bight in position. In this fashion, the connection of Figures 17a and 17b is made. As seen in the exploded view provided in Figure 17a, a conventional resistor 160 having lead-in terminal wires 161 may be connected with the braided tubular conductor 60 by the following steps. First, the lead-in wire 161 is inserted into the interior of the conductor 60 for electrical contact with its conductive interior wall. A U-shaped bight 162 is then formed in the wire 161 and in the portion of the conductor overlying it. This bight may, of course, be formed by any suitable tool, as well as by hand. A flat ferrule blank 163, having a centrally disposed slot 164 and centrally notched edges 165 extending parallel to the slot 164, may then be formed up into a U-shaped and slipped over the bight 162 with the bight projecting through the slot 164. This form 163a, of the ferrule blank is readily manipulated by an operator's fingers into a snug position where a clinching tool (not shown) of any suitable form may be employed to lock over the notched edges 165 in overlapped relationship upon the wire 161 and the conductor 60. In this locked-over form 163b (Figure 17b) the ferrule prevents the bight 162 from unfolding under tensile stress and at the same time, locks the conductor 60 upon the wire 161.

Figure 18A:
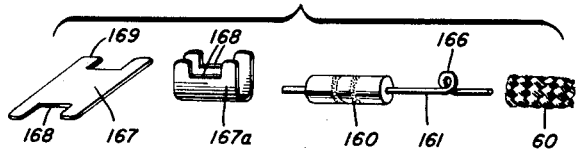
Figure 18a is an exploded perspective view of another type of parts used in connecting a resistor and a braided tubular conductor.
Figure 18B:
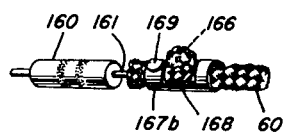

The similar connection illustrated in Figures 18a and 18b is formed by passing the conductor 60 over the wire 161, which serves as a so-called pigtail for the resistor 160, and then forming a loop 166 in the conductor and in the wire encased therewithin. In this embodiment, the unslotted ferrule blank 167 has relatively deep notches 168 formed in opposite edges 169. In assembly, the ferrule blank 167 is formed into a U-shaped blank 167a and is then clinched upon the looped portion 166 of the wire and conductor. In the clinched position, the edges 169 overlap so that the notches 168 together define a slot through which the loop 166 projects. The clinched ferrule 167b serves, then, to hold the conductor 60 upon the wire 161 and to prevent opening of the loop 166. Although for purposes of illustration the insulated conductor 60 is shown spaced somewhat from the resistor 160, it might equally cover the entire length of the wire 161 to protect the electrical connection completely from contamination. In view of the very effective electrical contact achieved by these connections, lead wires of smaller gauge may be used.

Figure 19A:
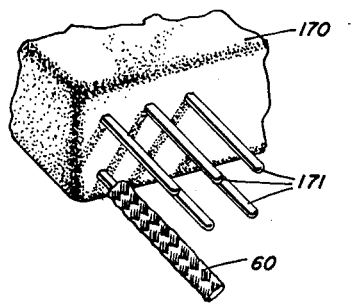
Figure 19a is a perspective view of a terminal block with a braided tubular conductor in place on one of its terminal pins.
Figure 19B:
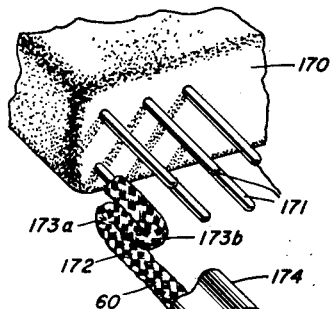
Figure 19b is a perspective view of this terminal block at an intermediate state in the connection of the foregoing conductor to the terminal pin.
Figure 19C:
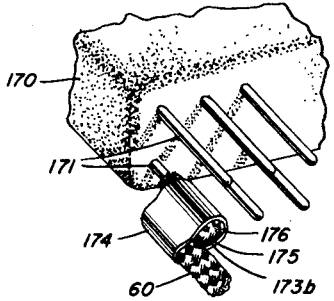
Figure 19c is a perspective view of the completed connection of the conductor to the terminal pin.

A terminal block 170, illustrated in Figures 19a, 19b and 19c, is provided with a plurality of terminal pins 171 for receiving the pliant, tubular conductor 60. While the illustrated conductor 60 has the form depicted in Figure 1, other forms of conductor herein described might equally well be suited for the connection made to the terminal pins 171. This connection is achieved by forming a sinuous, biflexive bend 172 in the conductor 60 and in the terminal pin 171 encased by it. Folds 173a and 173b of the bend 172 serve to pinch the conductor 60 and thereby to prevent it from being pulled off. However, to further secure the conductor 60 and to prevent unfolding of the bend 172, a ferrule 174 is provided which has a small cavity 175 and a larger cavity 167 opening upon one another. The smaller cavity 175 is adapted to receive the unfolded portion of the conductor 60, while the larger cavity 176 will snugly receive the fold 173b of the bend 172, which is closest to the terminal block 170. Where the terminal pins 171 are closely spaced, it will be apparent that the bends 172 may be positioned in a staggered orientation and may be turned outwardly from one another. Again, depending upon the ease with which the terminal pins 171 may be bent, this connection may be made without the use of tools.

Figure 20:
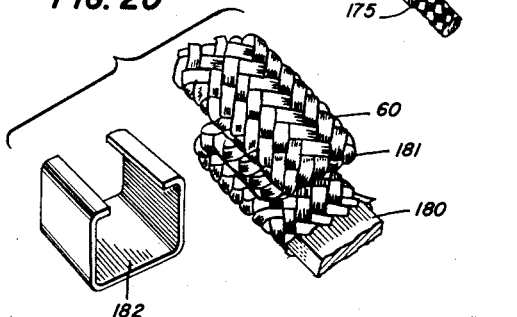
Figure 20 is an exploded, perspective view of a connection between a terminal lug and a braided tubular conductor.
Figure 33A:
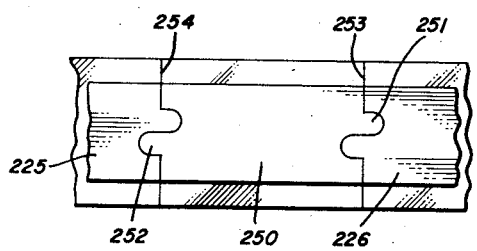
Figure 33a is a plan view of the part and an illustration of the first step in the making of a modified ferrule.
Figure 33B:
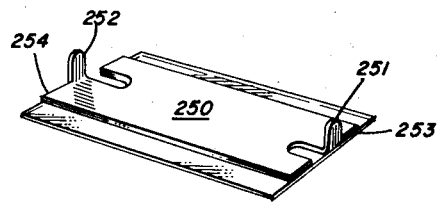
Figure 33b is a perspective view of a partially formed ferrule.
Figure 33C:
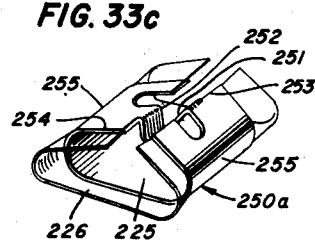
Figure 33c is a perspective view of a formed ferrule ready for assembling.
Figure 34:
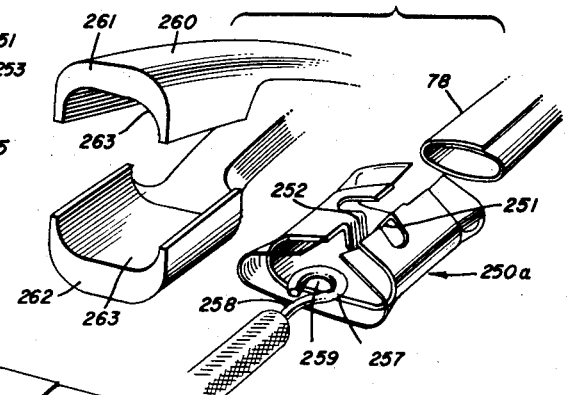
Figure 34 is a composite perspective view of the ferrule in Figure 33c positioned for connecting a tubular conductor to a looped wire terminal by operation of a clinching tool.
Figure 35:
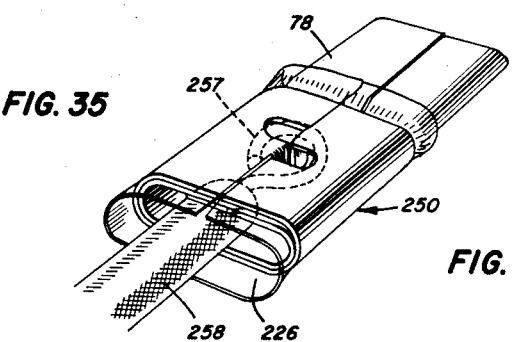
Figure 35 is a perspective view of the assembly in Figure 34 in final clinched position.
Figure 36:
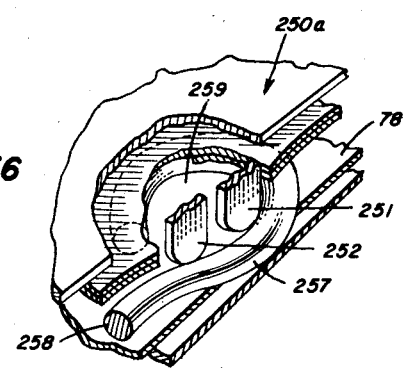
Figure 36 is an enlarged, fragmentary view of the connection formed as illustrated in Figure 35.

In Figure 20 a flat strip-like terminal lug 180 and the pliant, tubular conductor 60 received thereover have a sinuous biflexive bend 181 formed in their common length. The holding action of the biflexive bend 181 upon the conductor 60 may further be enhanced by encircling the entire bend with a split ferrule 182 of generally rectangular cross-section.

The series of Figures 21a through 21f illustrates yet another type of sinuous bend connection, here between the tubular conductor 60 and a terminal connector 185 (Figure 21f). This connector is provided with a tongue 186 (Figure 21a), which is formed as a straight portion of the key-shaped blank 185a. The tongue 186 is first completely inserted in the end of the tubular conductor 60 and is then bent 180° about its root 187 until it extends in spaced parallel relation to the body 188 of the blank. Thereupon, the tip 189 of the tongue is bent back 180° reflexively in the original direction of the conductor 60 to form a biflexive bend 190. During the course of this tongue-folding operation, side edge portions 191 may be bent up from the body 188 and then bent inwardly into abutting relation to encircle the bend 190 in the conductor and inserted tongue. Effectively, then a ferrule is provided which is integral with the tongue which makes internal electrical contact with the conductor 60. Suitable connection means, such as eyelet 192, may also be formed integrally with the ferrule and tongue, thus to provide a firmly anchored terminal connector.

Ready connection may be made between a pliant, tubular conductor, such as the conductor 88 of Figure 8, and a terminal lug 195 having a conventional slot 196, by the steps illustrated in Figures 22a through 22d. The first step is to slip the interior conductive wall 89 of the conductor 88 over the terminal lug 195, preferably over its full extent. A ferrule 197 composed of any suitable malleable material, which encircles the conductor 88, is then slipped along the conductor into registering position over the slot 196. A nubbin 198 is then formed in the ferrule 197 which interengages with the slot 196 to lock the conductor 88 in place and in firm electrical contact with the terminal lug 195. A further illustration of this connection is provided in Figures 23 and 24, wherein the connection is covered by an insulating sleeve 199. A device 200, such as a condenser can, is also illustrated to show a conventional mounting for the terminal lug 195.

Another terminal connector 205 for use with a pliant, tubular conductor, such as the conductor 88 of Figure 8, is shown on Figures 25 and 26. This terminal connector 205 has an eyelet portion 206 at one end and a rectangular connecting portion 207 at the other end provided with a centrally disposed slot 208. Intermediate the portions 206 and 207 is a reduced neck portion 209 (Figure 25). The conductor 88 is slipped over the eyelet portion 206, and partially over the rectangular portion 207 if so desired. About the neck portion 209, a clamping ring 210 is fastened, closely encircling and thereby securing the conductor 88 in place. Also, a rivet 211 extending through aperture 212 in the eyelet portion 206 is staked over to bind the conductor 88 in firm electrical contact with the eyelet portion.

While it is an object of this invention to avoid the necessity of stripping back insulation to expose a conductive surface for electrical contact, the employment of pressure sensitive adhesives for the seal strips 91 and 94 of the conductor 88 in Figure 8 so facilitates such stripping for this conductor that electrical connections requiring stripping may conveniently be made. Thus, in Figure 27, the insulating exterior wall 92 is stripped away from the interior conductive wall 89, so that the end portion 215 of the conductive wall 89 may be folded upon itself and punched to provide an aperture 216. A secure connection may then be made to a terminal block 217 by turning down a screw 218 through the aperture 216 into threaded hole 219 of the terminal block.

A standard terminal connector can also be attached to the exposed interior conducting wall 89. Thus, in Figure 28, there is shown a standard Thomas and Betts connector, 220, having a ferrule portion, 221, formed integrally with an eyelet portion, 222. Here, the end portion, 215, is rolled transversely in overlapping relationship upon itself to fit snugly within the ferrule portion, 221. A further step (not shown) of flattening the ferrule portion, 221, may be taken to provide complete security of the end portion, 215, with the connector 220.

Figures 29a through 32 illustrate another form of connection employing a ferrule interlocking with a terminal lug. In this instance, the ferrule may be formed from a blank 224 cut from a continuous strip 225 of metal or other formable material backed by a wider strip 226 of insulating material composed, for example, of "Mylar." In the blanking operation, a transverse cut 227 is taken to define a mating notch 228 and tab 229 in the edge portions 230 and 231, respectively, of the blank. These edge portions 230 and 231 are then bent up from the plane of the blank 224 and over in parallel relation therewith so that the tab 229 is received in the notch 228. Ferrule 224a thus formed comprises a generally oval split ring 225a with a split insulating sleeve 226a bonded thereabout. For securing a pliant, tubular conductor, here illustrated as the conductor 60 of Figure 1, upon a terminal lug 235 having an aperture 236, the ferrule 224a is first slipped over the end 60a of the conductor which end is thereupon slipped over the terminal lug 235. A clinching tool 238, which may be in the nature of a pair of pliers, is then brought up until the offset jaw-like dies 239 and 240 overlie the ferrule. The upper die 239 is provided with side arches 241 for applying lateral clinching pressures and a convex rib 241 with a centrally disposed tacking lip 243 for applying downward pressure. The lower die 240 is flat bottomed with slightly sloping sidewalls 244. When the dies are brought together upon the ferrule 224a the tacking lip 243 will first turn the tab 229 inwardly for interengagement with the aperture 236 provided in the terminal lug. Upon further application of pressure between the dies 239 and 240, the ferrule will be caved inwardly at the edge portions 230 and 231 to press the conductor 60 against the terminal lug 235 for intimate electrical contact. Because the portions 230 and 231 overlying the conductor 60 have generally a concave configuration, they will tend to preserve a resilient pressure upon the conductor despite the natural springback of the ferrule.

In Figures 33a through 36 there is illustrated a similar arrangement of ferrule-type connection. Here a ferrule blank 250 is cut from the strips 225 and 226 to provide tabs 251 and 252 projecting outwardly in offset relation from correspondingly notched edges 253 and 254, respectively. Following the blanking operation, the tabs 251 and 252 are bent at right angles along the edges 253 and 254. Bends 255 are then made in the ferrule blank 250 to bring the edges 253 and 254 in close parallel relationship. These bends 255 are less than 180° so that the tabs do not project inwardly beyond the 180° position of the edges 253 and 254. Ferrule 250a (Figure 33c) is thus prepared for slipping over a pliant, tubular conductor, which may be conductor 78 formed as in Figure 6. The ferrule will be adjusted in registry with a looped end 257 of connecting wire 258, so that the tabs 251 and 252 overlie the aperture 259 defined by the looped end 257. A crimping tool 260 may then be brought up so that its jaw-like dies 261 and 262 overlie the ferrule 250a. As the ferrule is compressed between the complementary die surfaces 263, which together define a generally oval cavity, the tabs 251 and 252 are forced inwardly into the aperture 259 of the wire 258. In this manner, the portion of the conductor 78 underlying the tabs is locked between the tabs and the wire 258 to resist tensile strains. At the same time, the ferrule will be compressed in a generally tight fitted relationship upon the end 257 of the wire so as to insure good electrical contact between the wire and the conductor. This embodiment of the invention finds particular utility in transitions from the tubular type conductor to the conventional insulated wire conductor.

In Figure 37 a connection set is illustrated which may be adopted for quick-disconnect needs of electrical connection. Thus, the terminal post 265 is provided with a pair of bulbous portions 266 and 267 spaced apart by a straight shank portion 268. The outermost bulbous portion 267 is adapted to seat in an inner socket 271 of connection clip 270. The connection clip 270 further has a reduced neck portion 272 to fit in complementary snug relation with the straight shank portion 268 of the terminal post. The bulbous portion 266 seats against a flared endwise skirt portion 273 of the connection clip 270. As the throat and skirt portions 272 and 273 are formed with lengthwise slots 274 to increase the resilient accommodation of the terminal post 265 in the clip 270, it will be apparent that a ready assembly may be effected by forcing the terminal post endwise into the connection clip. The connection clip is further provided with an integral flat portion 275 which may be received in a pliant, tubular conductor, such as the conductor 100 of Figure 10. The conductor 100 is secured in electrical contact with the flat portion 275 by means of rivet 276 staked therethrough. To further secure the conductor 100 in intimate electrical contact with the connector clip 270, there is provided a split band 276 which encircles the neck portion 272 of the clip and that portion of the conductor 100 which overlies the neck portion. Thus, it will be evident that a secure mechanical and electrical connection is effected by the illustrated clip and terminal post set.

In Figures 39a and 39b there are illustrated components of a clip-type connection wherein a strip-like terminal element 280 is provided having a slot 281 at one end and a ridge 282 formed near the other end. A flattened conductor, such as the interior conductive wall 89 of conductor 88 (Figure 8) is laid over the terminal element 280, so that a ridge 283 is formed in the wall 89 conforming to the ridge 282. Thereupon, a clip 285 having a complementary ridge 286 and down-turned corner tabs 287 is laid over the wall 89 with the ridges 282, 283 and 286 in registry. Thereupon, the tabs 287 are folded under the terminal element 280 to lock the clip and terminal element in assembly upon the wall 89. Connection may then be made in any conventional fashion to the slotted end of the terminal element so that current carried by the interior wall 89 of conductor 88 will pass through the terminal element. An exterior insulating wall 92 may then be refolded in overlying position with relation to the clip end terminal element assembly so as to insulate the entire connection.

Similarly, the interior conducting wall 89 illustrated in Figures 40a and 40b may be fastened to a terminal element 290 when the insulating exterior wall 92 is folded back. As the terminal element 290 has a reflex bend 291 formed at the end remote from its slotted end 292, the interior wall 89 may be looped upon itself at 293 and the free end 294 of the loop 293 inserted into a fold 295 of the bend 291. Rolled free edge 296 of the folded end 291 carries the loop 293 without risk of cutting it. Thereupon, a laterally-extending tab 297 formed integrally with the terminal element 290 adjacent the folded end 291 may be wrapped over the loop 293 and the fold 295 to secure the same in assembly. As with the embodiment illustrated in Figures 39a and 39b, the insulating exterior wall 92 may then be folded back in place and secured over the connection formed between the terminal element 290 and the looped end 294 of the conducting interior wall 289 for complete insulation of the connection.

Likewise in Figures 41a and 41b, a connection may be formed between the conducting interior wall 89 and a terminal element 300. Here, the terminal element 300 has legs 301 and 302 joined by a U-shaped bend 303 at their slotted ends 304, with a pair of opposing tabs 305 extending transversely from the roughened end 306 of the leg 301. In making the connection, a free end 294 of the conducting interior wall 89 is pressed between the roughenings 306, the leg 302 being roughened similarly to 301. Thereupon, the tabs 305 are wrapped around the conductor end 294 and the mating leg 302 to bind the same in firm electrical and mechanical connection.

It is contemplated that the conductors and means for connection here illustrated are well adapted to the layout of circuits in a relatively flat relationship. This type of circuitry may be referred to hereinafter as flat circuitry and is in a nature analogous to present-day printed circuit practices. However, it is characterized by a higher degree of flexibility and by a special suitability to breadboard or experimental hookups. To facilitate various connections between the pliant, tubular conductors used in flat circuitry like that of Figure 43, there is provided in Figure 42 a strip 310 of terminal connectors 310a, 310b, 310c and 310d, which is susceptible to formation by a simple blanking operation that results in a central stem 311 and a series of spaced cross arms 312. At the intersection of the cross arms with the stem are small apertures 313 to receive rivets (not shown) or other suitable fastening elements. Toward the extremities of the arms 312, and along the stem intermediate the apertures 313, are formed slots 314 which will serve to facilitate connections of the type illustrated in Figures 23 and 31. It will be readily apparent that with simple metal cutting shears or the like, the terminal connectors may be cut from the strip 310 in suitable forms, such as the L-shaped form 310a, the straight form 310b, the T-shaped form 310c, a cross-like form 310d, and other useful forms.

In utilization, the flat circuitry may be made up, as in Figure 43, on an insulating panel 315 composed of any suitable, self-sustaining material. As an example, a sheet of "Mylar" will serve excellently as an insulating material and at the same time will be form-sustaining when about 0.005 inch thick. In accordance with the proposed pattern of layouts, slots 316 are cut in the panel 315 of a size to receive pliant, tubular conductors, such as the conductors 60, collapsed until they are substantially flat. The conductors 60 are cut in suitable lengths and inserted through the slots 316 when it is desired to transpose conductors from one face of the panel 315 to the other. Thereupon, the ferrules 197 of Figure 23 are employed to make connections like that of Figure 35 between the looped lead wire 161 of circuit elements, such as capacitor 318 and resistor 160 and the conductors 60. A cross-type connector 310d is employed in this illustrated flat circuitry, which is fastened by rivet 323 to the panel board 315. One arm 312 is illustrated as projecting through a slot 316 while the remaining arm and the stem portions 311a are stepped above the panel 315. At the identifying numeral 325, a cross-over is effected between two conductors 60 without any contact there between, as the portion 326 lies beneath the panel 315 while the portion 327 lies above the panel. A standard socket 330 formed with terminal lugs 331 is also shown to be connected by means of ferrules 195 to associated braided conductors 60. To make the circuit layout relatively firm, an L-shaped connector 310a cooperates with the connector 310d to hold the resistor 160 in position, while slots 316 position the capacitor 318. To facilitate connections normal to the panel 315, the connector 310c has its arms 312 bent upwardly in parallel relation. The "Mylar" panel 315 being transparent, the resultant flat circuitry may readily be inspected and may also serve for display purposes.

The multi-conductor harness 340 of Figure 44 made up of a plurality of conductors 88a, 88b, 88c, and 88d is suitably bound up by means of ties 341 which may, of course, be composed of filamentary plastic material. Whereas the straight portions 342 of the conductors extend in parallel relation, suitable angular overturned folds 343 and 344 may be formed, as in the conductors 88a and 88b, respectively, so that these conductors will be led off in an angular direction from the body of the harness 340.

The illustrations in Figures 45 through 61 are predicated on the underlying principle of the invention emphasized above, namely, the use of stranded, braided electrically conductive tinsel, a fortifying component to take the tensile strains and an insulating covering which can be applied to the resulting conductor 60 in a number of ways. In each of Figures 45, 47, 48, 51, 53, 55 and 61 the fortifying component comprises a core 84 which forms the foundation on which the conductive layer 61 is braided in most instances, and is composed of silicone, or an equivalent of it, which has been extruded into a thread or cord. An equivalent substance suitable for the resilient, insulating core of "nylon," already identified above.

An insulating sheath such as identified as 63 in Figure 1, is now labeled 98 and consists of a braiding of glass fiber which covers the conductive braiding 61. The latter braiding consists of strands 62 which can be strips (Figure 47) or wires (Figure 45) of copper, or of ribbons of aluminum of silver foil in tinsel form, closely woven over and under in oppositely running helices as in the original application. In Figure 45 a metal contact pin 99 is integrally embodied in the conductor 60, by having the tinsel braiding 61 and the insulating sheath 98 extend over its corrugated inner end 104. The conductor is then passed through a bath of silicone or some equivalent insulating compound at room temperature, after which the coating is cured in a lacquer tower for approximately thirty minutes. The terminal 105 is applied as shown, and when the skirt 106 is compressed the result is a tight mechanical bond. The conductor thus completed is rendered proof against electrical leakage and the entrance of moisture and dirt.

The aforesaid conductor 60 is, in practice, very small, the illustration in Figure 45 being greatly enlarged. For example, if the conductor is intended to have a capacity of 400 circular mils the diameter of the silicone cord 84 will be 30 to 35 thousandths of an inch. For a conductor of such small size the insertion of the corrugated end 104 is facilitated by making a pilot opening. This is done with a simple tool consisting of a pointed probe 107, centered in a sleeve 108 by a bushing 109 driven hard into the sleeve. The sleeve rides on the conductor a little ahead of the probe, and as the point of the probe pushes in on the silicone cord it makes a flared opening into which the end 104 is inserted without difficulty.

Figures 47 through 51 illustrate modifications which revert to the flat type of conductor which predominates in original application Serial No. 380,957. In Figure 47 the core 84 is now rectangular in cross section instead of round as in Figure 45, and again consists of extruded silicone which is both an insulator and is resilient. As a further alternative, the core 84 can consist of a bundle of silicone strand as in Figure 48 there being a sufficient number of the strands to make up the desired cross-section, and flexibility is assured because of the stranding.

In any case, whether a solid or stranded core, the conductive layer 61 is braided on. In the example illustrated in Figure 47, eight #33 copper wires are used in the braiding, but it is manifest that the number of wires and the wire sizes will be graded to suit the kind of conductor to be fabricated, whether for a heavy or light electrical current. The next layer, as in instances before, is the braided cover of fiber glass 98. This cover is impregnated with silicone 114 or, as an alternative, the conductor can be run through a hot "nylon" bath. In all cases the outside layer adds greatly to the tensile strength of the conductor, remembering that the principal purpose of the core is to take the tensile strains and thus relieve the frail conductive braiding.

Figures 49, 50 and 51 illustrate the flat type of conductor 60 largely as a matter of convenience. The insulating cover 63 is now composed of a braiding of "Dacron" which substance consists of Mylar in thread form. It is recognized that both the fiber glass or "Dacron" cover are inherently subject to limited elongation (which would be true of any braiding), but when the braiding is done on the conductive layer 61 there will be considerable interface sinking of high places into low places with the result that the cover obtains a grip or lock onto the copper and thus materially check the elongation because of the mutual support.

In further reference to the core 84 both the silicone and the "nylon" can be substituted by a synthetic rubber composition of the GR-S compounds. These compounds are fully described in the Sales Catalogue of the Reconstruction Finance Corporation, Office of Synthetic Rubber, Washington 25, D.C. The particular synthetic rubber useful as the foregoing substitute is identified in that catalogue as GR-S 1016 and is described as a special purpose polymer especially noted for its low water absorption and good electrical properties. Its constituents are as follows:

Bound styrene _____ 23.5%.
Emulsifier _____ Fatty acid soap.
Polymerization temperature __ 122° F.
Conversion _____ 72%.
Shortstop _____ Hydroquinone.
Stabilizer _____ PBNA or BLE (staining).
Coagulation _____ Glue-acid.

A modification of the barb-type of connector disclosed in application 380,957, that is to say the type wherein a part of the metal impales the conductive braiding to make connection, is illustrated in Figure 50. Here the Dacron-braided conductor of Figure 49 has slipped onto it a metal ferrule 124 with one or more pins 127 intact with it and pointed inward. When the tubular copper braiding 61 is fitted on a terminal, especially one with a hole in it as in Figures 16a and 22a, and the ferrule is pressed flat the pin will puncture the copper braiding, enter the hole in the terminal and at the same time make an electrical connection and a lock against pulling the conductor off.

The utilization of coated thin-sheet material already has a basis in the original application, and the principle is extended herein. Figure 51 illustrates a bi-metallic foil 132 wherein the initial copper foil 133 has applied to it by spraying, electro-deposition or an equivalent, a layer of tin 143. The order of the metal constituents and the nature of the constituents themselves will be determined by circumstances, and as is brought out, the bifacial sheeting can be both insulative and conductive.

Reverting to Figure 51, while copper is a good electrical conductor, its oxides, produced by the action of moisture when exposed to it, corrode the surface and hinder the flow of current. When sealed against access by moisture as by tight contact with the insulating core 84 and when coated with tin 143 (or some other nonferrous sheath) the copper foil 133 will be closed from the weather inside and outside.

The transition at this point results in combining the insulating ribbon of "nylon" in Figures 2 and 3 of the application and the coated metallic foil of Figure 51 and coming up with an insulating ribbon with a conductive layer, the bifacial sheeting referred to. This transition involves the Mylar sheeting 101 with its metallic coating 102 in Figure 10 of the original application. The product now in mind begins with a sheet 154 of Mylar, "nylon" or an equivalent plastic substance, illustrated in Figure 52. The metallic coating, whether of copper, aluminum, silver or equivalent non-ferrous metal is indicated 155. This sheet is to be reduced to narrow strips 156 by cutting along the lines 159.

The braiding principle, extensively emphasized in these applications, again comes into play. Figure 53 illustrates how the strips 156 are braided onto the insulating core 84, the metal 155 on the inside and the Mylar 154 on the outside. This particular braiding has several important effects. First, with one braiding operation the core 84 will be covered with a complete layer of conducting metal and the exposed surface will be that of the Mylar base. Second, the criss-crossing of the strips scrambles the electrical fields of the individual copper components. The revolving field of any one conductor will run counter to the revolving field of a crossing conductor so that one field neutralizes the other and the external electro-static effect becomes practically nil.

Figure 54 illustrates a fractional development of the braiding, showing how the strips run over and under, producing a complete conducting layer on the inside. The main purpose of this illustration is to show a final coat 63 of insulation. By preference this consists of a hot dip of "nylon," the advantage of which is the smoothing of the external surface and an insurance against the entrance of moisture to affect the copper.

The strip idea in the immediately preceding description also has the import effect of making it possible to vary the current carrying capacity of a conductor without varying its cross-section. This principle is illustrated in Figure 55. In addition to the metal-faced Mylar strips 156 there is to be a supply of plain Mylar strips 177. These, as shown in Figure 55, are alternated in the braiding with strips 156 having the conductive facing 155. If for example, eight strips are used in making a braiding and four of these are plain, that is to say, minus the conductive facing, the current carrying capacity will be half the capacity of a full metal-faced braiding. On this principle a fine gradation of current carrying capacity can be arrived at first, by making the strips as numerous as necessary for a given size of conductor, second, by substituting active strips with inert strips until the copper content is reduced to the amount desired.

The next phase of the invention hinges on the use of what is known as unstabilized "nylon" yarn. When such yarn is given a heat treatment it becomes cured, in other words, it is shrunk or stabilized to the point whereat it will not shrink anymore. This ability to shrink has a useful application in the sealing off of an electrical connection. Figures 56, 57 and 58 illustrate one way by which the principle is applied. The resistor 160, having in mind a similar resistor in Figure 17a, has a terminal wire 161 over which the conductor 60 is slid into final place. This conductor is to be regarded as a combination of copper and "nylon," that is to say, the conductive coating is intimately bonded on freshly manufactured "nylon" or, in any event, unstabilized "nylon."

After the conductor is slid in place a tool 178 consisting of two matching dies, previously heated to 250° F. is used to crimp the conductor into a bight (Figure 57), and as it does so the heat shrinks the "nylon" in place (see Figure 58). A variation of this heat sealing without the crimping is illustrated in Figures 59 and 60. Virtually any kind of terminal lug will do for the illustration, the four-way junction 115 (Figure 12) serving the purpose. The conductor 60, identical with the type in Figure 14, is pushed over the arm 116 and the triangular barb 121 struck up from it. The conductor, being pliable, will yield as it adapts itself to the high points. A heating device 179 is now put around the joint, and, assuming the heat to be on, the unstabilized "nylon" will shrink down on the arm 116, conforming itself to the barb and the corners of the arm, thus bonding metal to metal and making it ordinarily impossible to pull the conductor off. The final result is shown in Figure 60.

Since the conductor 60 is tubular, it is possible to telescope a plurality of them, leaving them either in cylindrical form as in Figure 5, or collapsing them into tape (flat) form. Figure 61 reverts to the cylindrical form, showing how a number of terminals can be built up in concentric arrangement, useful for instance as a jack for hearing aid cords. Here the pin terminal 183 comprises an extension of the insulating core 84, the diameters, preferably, being the same so that no lumps will appear at the joint where the innermost copper-Mylar conductor 60 overlaps to make the inside electrical connection.

The conductor 60 is given a coating of insulation 184 by dipping in a bath of silicone, as described in connection with Figure 1. The outside conductor 193 is now added, but the copper constituent 194 faces the outside instead of the inside, this in order to make electrical connection with the sleeve terminal 201. A covering 202 of Mylar or Dacron is braided on as shown, and, by preference, a hot dip provides an insulating sheath 203 with the advantages already described. This sheath is, desirably, transparent because one or more of the strands of the braiding 202 will be colored when a color code is required. By extension of the coding idea, the sheath 203 can be both opaque and colored, in which case distinguishing stranding is purposeless in the covering 202.

The solderless connections and the pliant, tubular conductors herein illustrated and described, have revolutionary advantages over present-day practices and are adapted to a wide variety and facility of electrical layouts. The materials mentioned in the course of description are not intended as limitations, but are put forward as illustrations to facilitate the practice of this invention. In this regard, it will be apparent that conductive materials such as aluminum may be employed throughout such a circuit as is shown in Figure 43 for a great advantage in economy and weight-saving. It will be understood that the embodiments of this invention herein described as intended merely to exemplify its principles, rather than in limitation, and that numerous modifications and alterations may be made thereto without departure from the spirit and scope of the invention, as set forth in the appended claims.

In conclusion, emphasis must be laid on the principle of skin effect which becomes a pronounced factor in the tubular formation of the conductor, especially when alternating current is involved. The higher the frequency of the current the greater the continuous cutting of the conductor by the flux from the alternating current and, as the result, the greater the internal counter electromotive force which opposes the flow of current near the center of the conductor and the tendency to confine the current flow to the circumference of the wire. This phenomenon in solid wires produces the greatest current density at the surface and is known as the skin effect.

Translating this effect to the tubular conductor proposed herein, the elimination of a solid metallic core in turn eliminates the crowding of the current flow to the core of the conductor and transfers it to a circumference where it has a freer flow and a reduction in heating due to the elimination of the internal counter electromotive force mentioned above.

By using the braiding system of flattened wires of a given size the resultingly spreading out of the surface produces an increase in the radiating area so that a conductor of this type will carry a greater amount of current due to the reduction in temperature than a conductor of the internally solid type.

What is claimed and desired to be protected by Letters Patent of the United States is:

1. An electrical connection comprising a pliant tube having a conductive interior wall formed of flat conductive strands braided over and under in oppositely running helices and an elastic insulating exterior wall, said tube being adapted to expand at either end by a loosening of the braid and a stretching of the exterior wall, a flat terminal lug having four arms disposed in a cross-like array, each of said arms having tapered side edges extending convergently from a pair of shoulders, a recessed fillet at the intersection between said side edges to provide a weakened root for said arms, each of said arms having a barb stuck up therefrom to provide a shoulder generally aligned with said shoulders adjacent said side edges, said conductor being expanded over one of said arms and its shoulders for internal electrical contact therewith, and a ferrule composed of a rubber-like material tapered complementary to said side edges and having a lip inturned from the ferrule edge of greater circumference and engageable with said shoulders when said ferrule has been forced over said tapered side edges and the expanded portion of said conductor.

2. An electrical connection comprising a pliant conductor having a tublular electrical conductive interior wall and a tubular insulating exterior wall, a terminal having a flat body portion, a flat lug formed on said body portion and disposed within one end of said conductor in electrical contact with said conductive interior wall and having smooth tapered side edges extending convergently from a pair of shoulders formed at the junction of said edges with said body portion, a barb struck up from said lug to provide a shoulder substantially in alignment with said pair of shoulders and at a right angle with respect thereto, and a ferrule composed of elastic material disposed about said insulating exterior wall for maintaining the interior wall in electrical contact with said lug, and an inturned lip on said ferrule in locking engagement with the shoulders on the body portion and the barb for securing said conductor to said lug.

3. An electrical connection comprising a flexible conductor having a metalized tubular conductive interior wall in back-to-back relation with respect to a tubular insulating exterior wall, a terminal lug fitted within one end of said conductor in electrical contact with the interior wall, a flexible securing device forcibly fitted over the exterior wall to compress and maintain the interior wall in contact with said lug, said lug having a pair of mutually spaced shoulders and a shoulder disposed between said pair of mutually spaced shoulders and at a right angle with respect thereto, and an inturned lip formed on said flexible securing device in gripping engagement with said pair of mutually spaced shoulders and the shoulder therebetween for locking the conductor to said terminal lug.

4. An electrical connection comprising a pliant tube structure having an interior tubular wall formed of ribbon-like strands braided over and under in oppositely running helices and composed of electrical conducting material and a tubular exterior wall composed of insulating material, a terminal lug fitted within one end of said tube in electrical contact with said interior tubular wall, an elastic ferrule closely fitted about the exterior wall for pressing the interior wall into contact with said lug, inturned locking means on said elastic ferrule, and complementary locking means on said lug, said locking means on the lug including a pair of mutually spaced shoulders and a shoulder disposed centrally between said pair of mutually spaced shoulders and engaged by said inturned locking means on the elastic ferrule for locking the tube to said lug.

5. An electrical connection comprising a pliant conductor having an interior tubular wall formed of flat conductive strands braided over and under in oppositely running helices and a tubular insulating exterior wall, said interior tubular wall being more yieldable under tensile stress than said exterior wall, whereupon tensile stress is carried primarily by said exterior wall, an electrical terminal having a centrally disposed protuberance and a pair of shoulders disposed at a right angle with respect to said protuberance and forcibly fitted within one end of said conductor in electrical contact with said interior tubular wall, a sleeve composed of elastic material applied to the exterior wall of the conductor for maintaining said interior tubular wall in contact with the terminal, protuberance and the pair of shoulders, and an inturned flange formed on said sleeve in engagement with the protuberance and the pair of shoulders for locking said conductor to the terminal.

6. An electrical connection comprising a pliant conductor having an interior tubular wall formed of flat conductive strands braided over and under in oppositely running helices and a tubular insulating exterior wall, said interior tubular conductive wall being more yieldable under tensile stress than said exterior insulating wall, whereupon tensile stress is carried primarily by said tubular exterior wall, a terminal having a lug formed therewith and forcibly fitted within an end of said conductor, a pair of mutually spaced shoulders formed on said lug, a barb struck up from said lug and disposed centrally and at a right angle with respect to said pair of shoulders, an elastic clamping device disposed about the exterior wall for forcibly maintaining the interior wall in electrical contact with the lug, the pair of shoulders, and the barb, and inturned securing means on said clamping means in engagement with said pair of shoulders and the barb for locking the conductor to the lug.

7. An electrical connection comprising a pliant conductor having an interior tubular wall formed of flat conductive strands braided over and under in oppositely running helices and a tubular insulating exterior wall, said conductor being expandable at either end by loosening a predetermined amount of the flat braided strands, a flat terminal member, a flat arm carried by and disposed in the same plane as the terminal member and having a pair of shoulders formed thereon, said arm being provided with smooth tapered side edges extending convergently from said shoulders, a barb formed on said lug and disposed centrally between said edges in spaced relation with respect to said pair of shoulders, a shoulder formed on said barb and disposed at a right angle with respect to said pair of shoulders and substantially in alignment therewith, a ferrule composed of elastic material and tapered complementary to said smooth side edges on said flat arm for applying a sufficient amount of pressure to said insulating wall to maintain the interior tubular wall at the expanded end thereof in electrical contact with the terminal member, and an annular inturned lip formed on said ferrule in engagement with said pair of shoulders on the terminal member and the shoulder on the barb for locking and maintaining the conductor resiliently upon said terminal member.

8. An electrical connector comprising a pliant tube having a tubular conductive interior wall formed of a unitary metal foil and having a tubular exterior wall bonded thereto, a terminal lug fitted within one end of said tube in electrical contact with the interior wall, a tubular member forcibly applied to the exterior wall of the tube and sufficiently resilient to compress said tube an amount sufficiently to maintain said conductive wall in electrical contact with said terminal lug, locking means on the terminal lug, said locking means including at least four pairs of mutually spaced shoulders and a plurality of struck-up members each having a shoulder disposed substantially at a right angle with respect to said mutually spaced shoulders and in engagement with said interior wall for locking said tube to the lug, and flange means carried by said tubular member in engagement with said mutually spaced shoulders and with each shoulder on said plurality of struck-up members for locking the tube.

9. A crossover connector comprising a metallic conductive member having a flat horizontal body portion with four arms integrally formed therewith and extending outwardly therefrom and in the same plane with respect thereto, said arms having smooth tapered side edges converging to a squared-off outer edge, a recessed fillet disposed at the junction of said body portion with said tapered side edges of each arm for forming a pair of mutually spaced shoulders on each of the arms, a barb struck up from each arm centrally with respect to the pair of shoulders thereon for providing an additional shoulder in substantial alignment with the pair of shoulders on each arm and disposed substantially at a right angle with respect thereto, and a centrally disposed aperture formed in said body portion at the intersection of said arms to facilitate securement of the connector in a desired position upon a panel.

References Cited in the file of this patent
UNITED STATES PATENTS

| | | |
|---|---|---|
| 319,326 | Sawyer | June 2, 1885 |
| 717,778 | Spaulding | Jan. 6, 1903 |
| 2,436,984 | Wilson | Mar. 2, 1948 |
| 2,438,362 | Dunkelberger et al. | Mar. 23, 1948 |
| 2,449,983 | Devol | Sept. 28, 1948 |
| 2,476,429 | Paules | July 19, 1949 |
| 2,527,172 | Beaver et al. | Oct. 24, 1950 |

(Other references on following page)

UNITED STATES PATENTS

| | | |
|---|---|---|
| 2,536,862 | White | Jan. 2, 1951 |
| 2,615,953 | Waite | Oct. 28, 1952 |
| 2,647,224 | Bruck | July 28, 1953 |
| 2,662,931 | Mougey | Dec. 15, 1953 |
| 2,681,440 | Swengel | June 15, 1954 |
| 2,683,839 | Beck | July 13, 1954 |
| 2,711,520 | Kernen | June 21, 1955 |

FOREIGN PATENTS

| | | |
|---|---|---|
| 139,416 | Great Britain | Mar. 4, 1920 |
| 125,943 | Great Britain | Mar. 18, 1920 |
| 214,525 | Great Britain | Apr. 24, 1924 |
| 615,529 | France | Oct. 12, 1926 |
| 332,671 | Great Britain | July 30, 1930 |
| 125,496 | Australia | Sept. 16, 1947 |
| 460,156 | Great Britain | Jan. 22, 1937 |